United States Patent
Nelson et al.

[11] Patent Number: 5,429,074
[45] Date of Patent: Jul. 4, 1995

[54] STORAGE APPARATUS FOR CULTIVATING OYSTERS

[76] Inventors: Eddie Nelson, P.O. Box 186;
Benjamin H. Nelson, Rte. 2, Box 756,
both of Anahuac, Tex. 77514

[21] Appl. No.: 16,690

[22] Filed: Feb. 12, 1993

[51] Int. Cl.6 .............................................. A01K 61/00
[52] U.S. Cl. ...................................... 119/239; 119/240
[58] Field of Search ............... 119/2, 3, 4, 207, 208, 119/223, 238, 240, 239

[56] References Cited

U.S. PATENT DOCUMENTS

| | | | |
|---|---|---|---|
| 3,717,124 | 2/1973 | Jacobs | 119/3 |
| 3,741,159 | 6/1973 | Halaunbrenner | 119/4 |
| 4,079,698 | 3/1978 | Neff et al. | 119/3 |
| 4,257,350 | 3/1981 | Streichenberger | 119/3 |
| 4,351,268 | 9/1982 | Blair et al. | 119/3 |
| 4,434,743 | 3/1984 | Nickel | 119/4 |
| 4,704,990 | 11/1987 | Moxham | 119/4 |
| 4,947,791 | 8/1990 | Laier et al. | 119/3 |

FOREIGN PATENT DOCUMENTS

| | | | |
|---|---|---|---|
| 2420920 | 11/1979 | France | 119/3 |
| 2482418 | 11/1981 | France | 119/2 |
| 2533112 | 3/1984 | France | 119/3 |
| 1041082 | 9/1983 | U.S.S.R. | 119/4 |
| 8203152 | 9/1982 | WIPO | 119/3 |

Primary Examiner—Todd E. Manahan
Attorney, Agent, or Firm—Kenneth D. Baugh

[57] ABSTRACT

An oyster cultivating apparatus 10 is provided including a first cylindrically shaped elongated member 12 having an open area 14 extending therethrough and a first plurality of openings 16 formed thereabout. An upper member 20 is provided to cover an upper portion of the first elongated member 12 and a base member 24 is provided to cover a lowermost portion of the first elongated member. A second cylindrically shaped elongated member 38 having an open area 40 extending therethrough and having a second plurality of openings 44 formed thereabout, which are smaller than the first plurality of openings 16, is provided to be aligned in the first elongated member 12 so that the second plurality of openings 44 are in direct alignment with the first plurality of openings 16. A buoyant member 46 is alignable in the first and second elongated members 12 and 38 so that the first and second elongated members can be maintained in water 50 in a substantially horizontal position a predetermined distance above a water floor surface 52 when oysters 54 are being cultivated.

18 Claims, 4 Drawing Sheets

5,429,074

STORAGE APPARATUS FOR CULTIVATING OYSTERS

TECHNICAL FIELD

This invention relates to an apparatus for cultivating oysters and more particularly to a storage apparatus which allows a user to cultivate and grow oysters in a natural and favorable environment. The popularity of oysters as a food product makes the need to maximize oyster crop yields an ongoing concern. This concern of course makes cost effective equipment important because the most favorable environments for maximizing oyster crop cultivation can be problematic. It is not at all unusual in the most favorable environments for oyster cultivation to find oysters subjected to natural hazards such as silting from storms, predators, such as starfish and pollutants emanating from the water floor surface. Accordingly, it is desirable to provide a cost effective apparatus which allows the oysters to be cultivated in the most favorable environment while at the same time minimizing the effect the hazards associated with this environment may have on the oyster crops ultimate yields.

BACKGROUND ART

Attempts have been made to provide devices that will enhance the cultivating of oysters. One such device is disclosed in U.S. Pat. No. 4,704,990. This device is a water permeable container which is placed in suitable water to feed the oysters while the container is rotated to regularly move the oysters in the container. Rotation is caused by a separate apparatus attached to the container which is either actuated mechanically or by the tide. Another arrangement is disclosed in U.S. Pat. No. 4,377,987. This device includes a combination of vertical row trays suspended from carrying ropes and enveloped by a protection net. Each tray has a rim and bottom net and a system for releasably fastening the trays to the carrying ropes.

Although these devices are acceptable both devices because of their structures can be somewhat impractical when the desire is to provide the simplest and most inexpensive arrangement achievable that addresses the problems associated with oyster cultivating.

DISCLOSURE OF THE INVENTION

An apparatus for cultivating oysters is provided. The oyster cultivating apparatus of this invention includes a first cylindrical shaped elongated member having a first plurality of openings formed therein and a first elongated open area extending therethrough. An upper member is removably couplable to an uppermost portion of the first elongated member and a base member is removably couplable to a lowermost portion of the first elongated member. A second cylindrical shaped elongated member having a second elongated open area extending therethrough and a second plurality of openings formed therein which are smaller than the openings of the first plurality of openings is alignable in the open area in the first elongated member so that the second plurality of openings are adjacently aligned with the first plurality of openings. The oyster cultivating apparatus also includes a buoyant member which is provided to rest in the open area of the second elongated member so that the first and second elongated members are maintained in a substantially horizontal position when submerged in water.

BRIEF DESCRIPTION OF THE DRAWINGS

The details of the invention will be described in connection with the accompanying drawings in which.

BEST MODE FOR CARRYING OUT THE INVENTION

Figure 1:
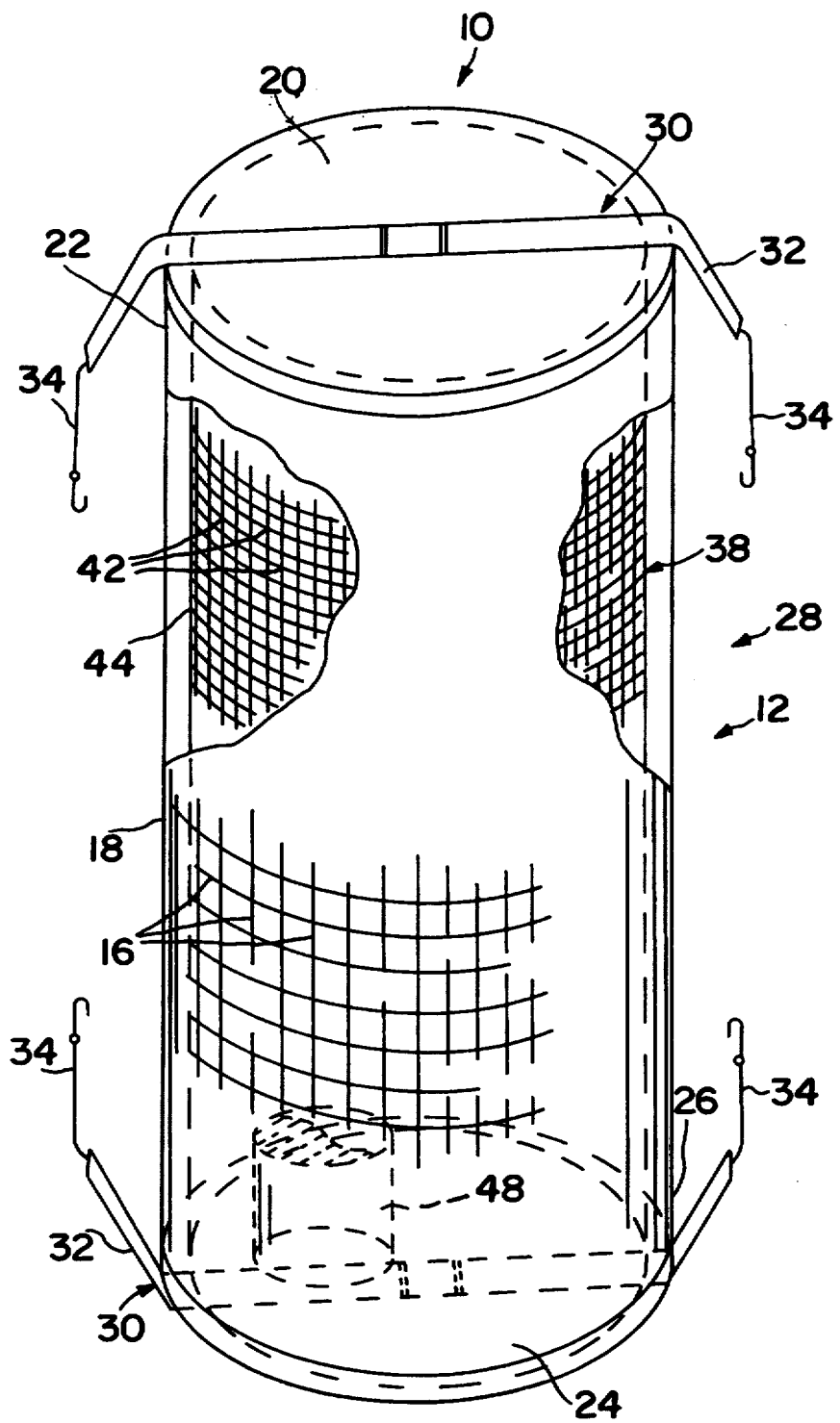
FIG. 1 is a perspective view illustrating an oyster cultivating apparatus in accordance with the principals of the invention.
Figure 2:
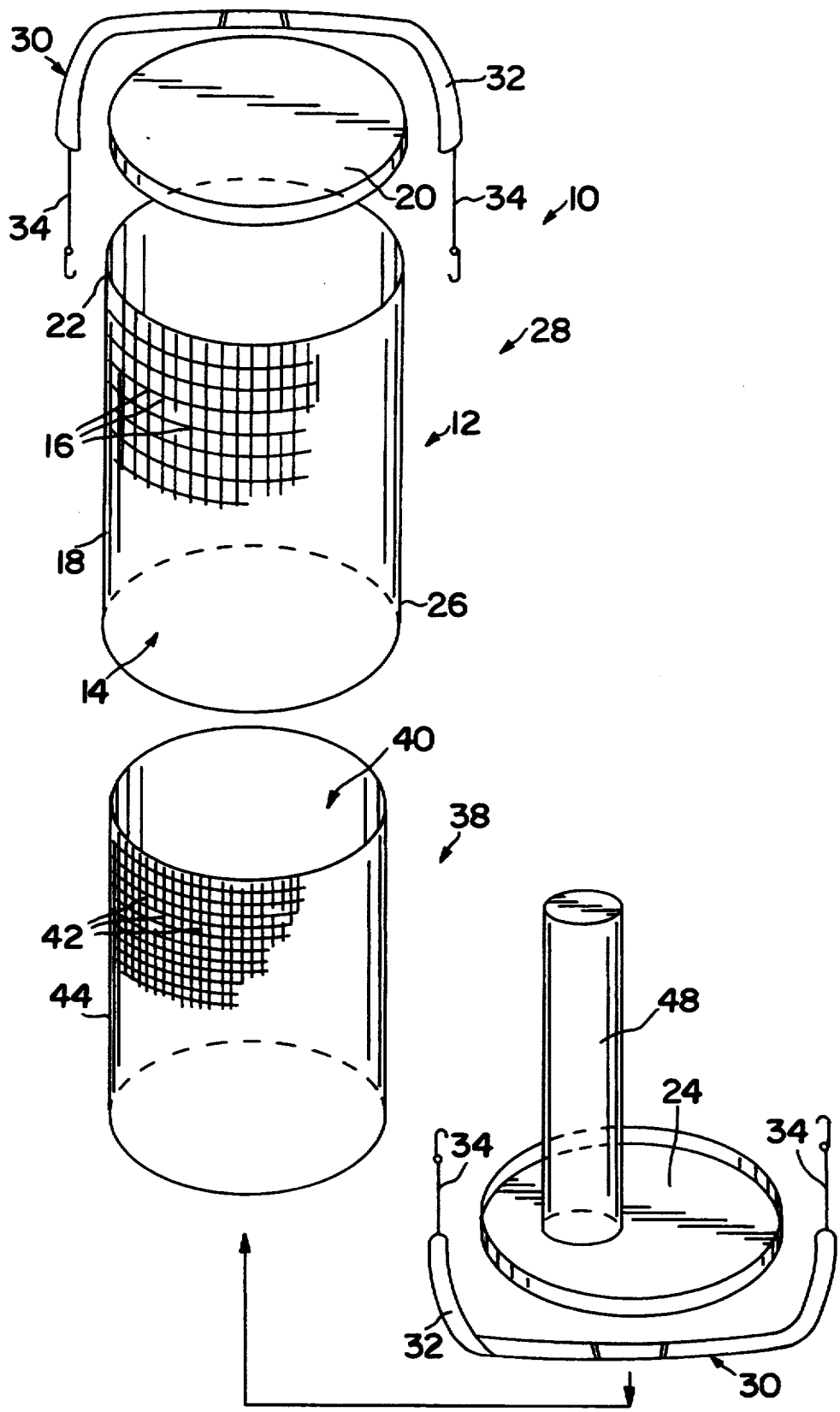
FIG. 2 is an exploded perspective view illustrating the oyster cultivating apparatus in accordance with the principles of this invention.
Figure 3:
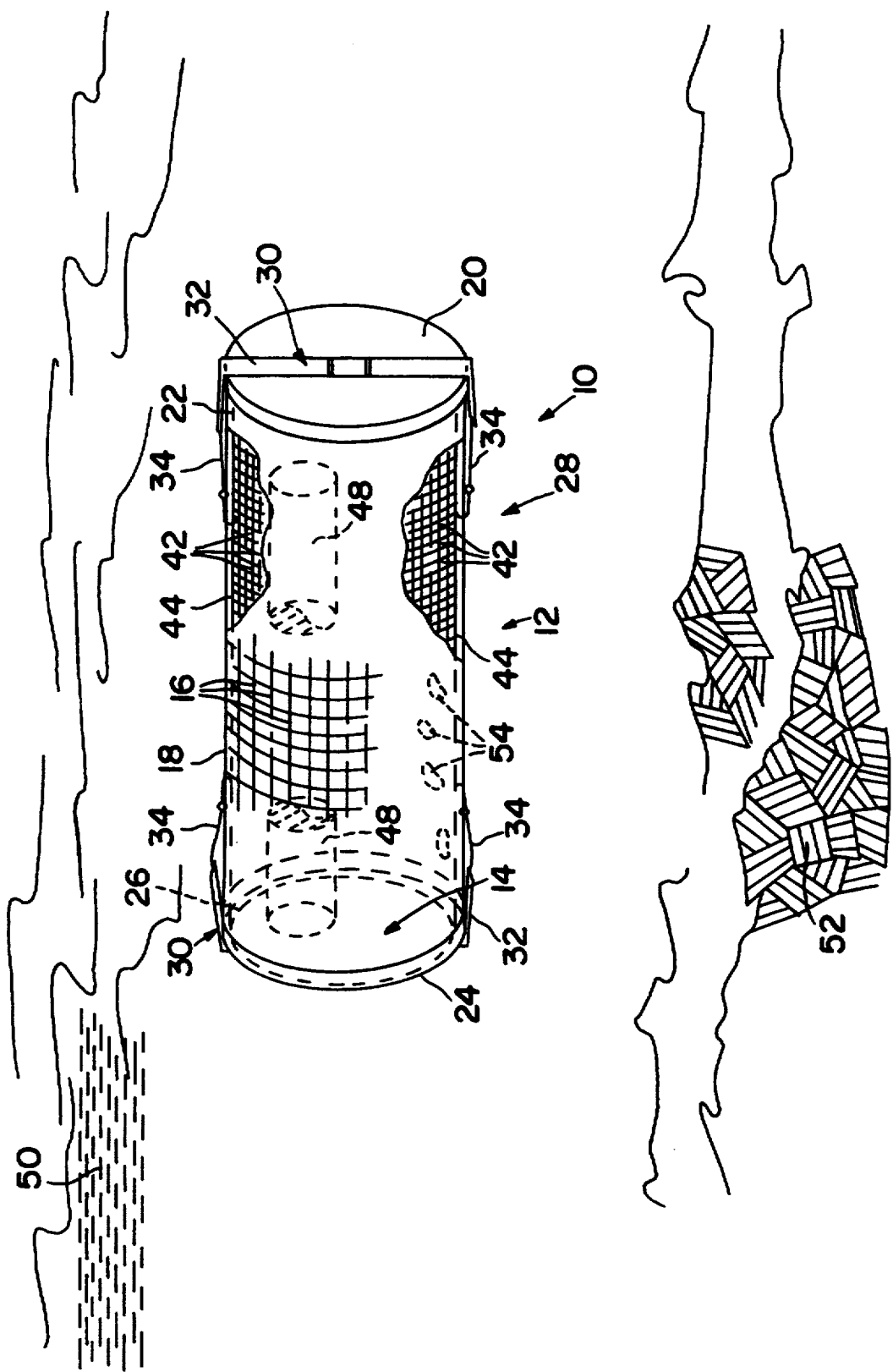
FIG. 3 is another perspective view illustrating the oyster cultivating apparatus in accordance with the principles of this invention.

Referring to FIGS. 1, 2 and 3 there is shown an oyster cultivating apparatus, generally designated by the numeral, 10. The oyster cultivating apparatus 10 includes a first cylindrically shaped elongated member, generally designated by the numeral, 12 having an elongated open area 14 extending therethrough. A plurality of spaced aligned apertures 16 are formed on a surface 18 of the elongated member 12. An upper member 20 is provided to cover an uppermost portion 22 of the first elongated member 12 and a base member 24 is provided to cover a lowermost portion 26 of the elongated member and thereby form a container 28. Coupling members, generally designated, 30 are provided to allow the upper member 20 and the base member 24 to be removably couplable to the first elongated member 12. The coupling members 30 are each provided with an elastic strap 32 having an engaging member 34 attached to each end thereof which engages selected portions of the elongated member 12 to accomplish coupling.

The first elongated member 12 may be formed of a lightweight hard plastic or a plastic coated wire having gauge or mesh walls. The apertures 18 in the first elongated member 12 are large enough to allow water to freely flow in and out of the elongated member while small enough to keep oysters in the container 28 doing latter stages of the cultivating process.

The oyster-cultivating apparatus 10 is also provided with a second cylindrically shaped elongated member generally designated, by the numeral, 38. The second elongated member 38 is provided with an open area 40 extending therethrough and a plurality of spaced aligned apertures 42 formed on a surface 44 thereof. The second elongated member 38, is also formed of a lightweight hard plastic or a plastic coated wire having mesh walls and has a circumference slightly smaller than that of the first elongated member 12. As a result, the second elongated member 38 can be aligned in the open area 14 of the first elongated member 12 so that the apertures 42 are aligned with and adjacent to the apertures 16. The apertures 42 in the second elongated member 38 are smaller than the apertures 16 in the first elongated member 12. The smaller apertures 42 allows infant oysters to be held in the first and second members during the initial steps of the cultivating process.

The oyster cultivating apparatus 10 also includes an elongated cylindrically shaped buoyant member 48. The buoyant member 48 is provided to rest in the open areas 14 and 40 of the first and second elongated members 12 and 38, respectively. The buoyant member 48 is provided to allow the container 28 to float horizontal in water 50 four to six inches above the water floor surface 52 during the cultivating process. The buoyant member 48 is substantially the same length as the first and second elongated member 12 and 38 and may be made, for example, of a buoyant material such as styrofoam. The diameter of the buoyant member 48 may vary depending on the size and number of oysters that are being cultivated. For example, a buoyant member 48 which is six inches in diameter may be used to support a container 28 holding 200 maturing oysters 54 (FIG. 3) in a horizontal position four to six inches off the water floor surface 52 while a buoyant member 48 which is four inches in diameter may be used to support a container 28 holding 800 juvenile oysters in a horizontal position four to six inches from the water floor surface.

When it is desired to cultivate oysters 54 using the apparatus 10 of this invention the container 28 is assembled without the upper member 22. That is, initially only the base member 24 is coupled to the lowermost portion 26 of the first elongated member 12 with coupling members 30. Once this is accomplished the second elongated member 38 is then aligned in the open area 14 in the first elongated member 12 so that the apertures 42 in the second elongated member are aligned with and adjacent to the apertures 16 in the first elongated member. Once the second elongated member 38 is in place in the first elongated member, the buoyant member 48 is placed in the open area 40 in the second elongated member 38. Infant oysters 54 are then placed in the open area 40 in the second elongated member 38 and the upper member 20 is then coupled to the uppermost portion 22 of the first elongated member 12 so that the oysters are sealed in the container 28. The cultivating apparatus 10 is then placed in water 50 (FIG. 3) where the cultivating will take place. The oysters 54 are allowed to cultivate and grow a predetermined amount of time until they are too large to exit the apertures 14 in the first elongated member 12. Once the oysters 54 have reached this size, the apparatus 10 is removed from the water 50 and the second elongated member 38 is removed from the container 28. The apparatus 10 is then placed back in the water 50 until the oysters 54 are fully cultivated.

Figure 4:
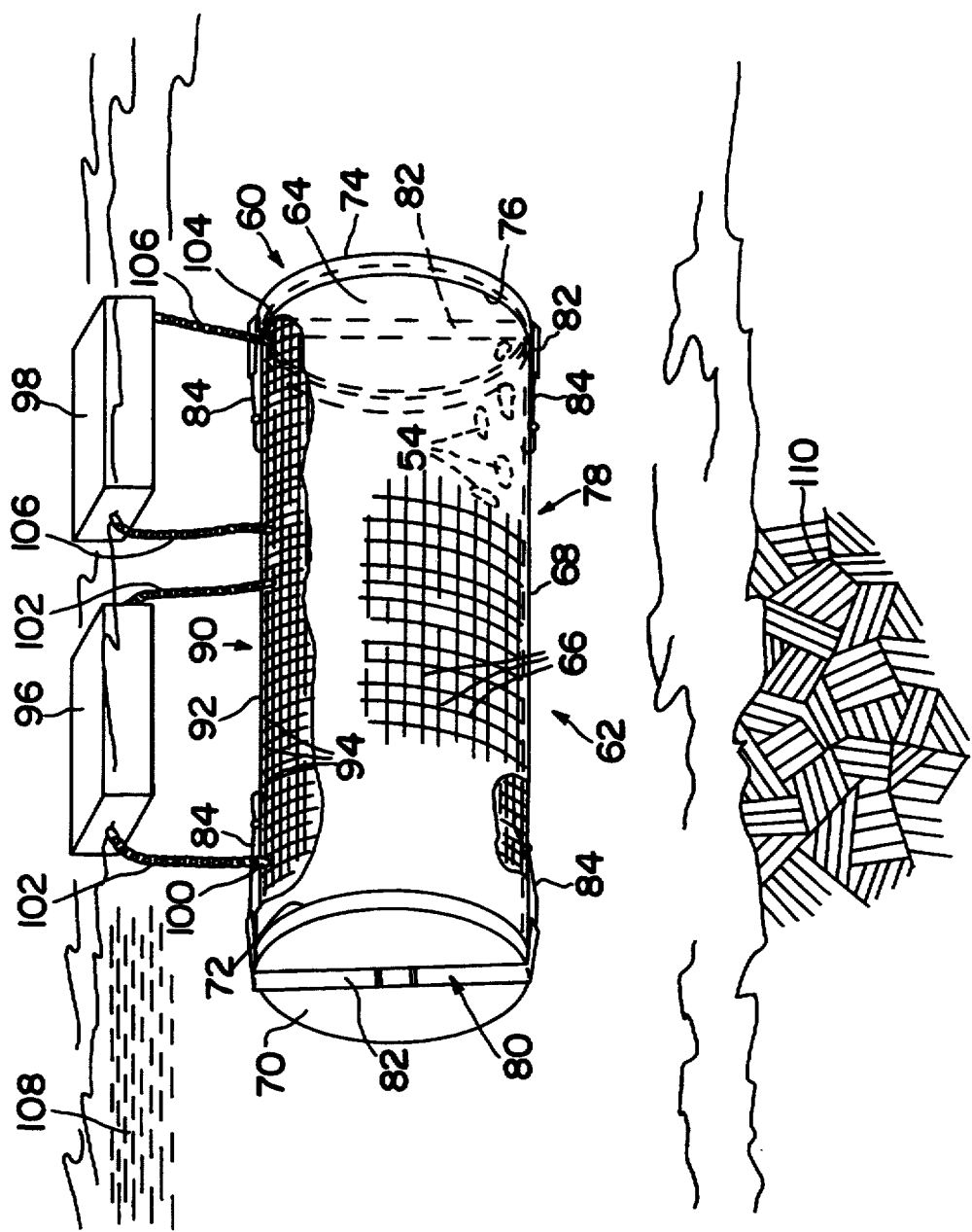
FIG. 4 is a perspective view illustrating another embodiment of the oyster cultivating apparatus in accordance with the principles of this invention.

A second embodiment of the invention is illustrated in FIG. 4. In this embodiment, an oyster cultivating apparatus, generally designated, by the numeral 60 is provided including a first cylindrically shaped elongated member, generally designated by the numeral, 62, having an open area 64 formed therein. The elongated member 62 also has a plurality of spaced aligned apertures 66 formed on a surface 68 thereof. An upper member 70 is provided to cover an uppermost portion 72 of the first elongated member 62 and a base member 74 is provided to cover a lowermost portion 76 of the elongated member. Coupling members, generally designated by the numeral, 80 are provided having an elastic strap 82 and engaging members 84 attached to each end thereof. The coupling members 80 are provided to couple the upper and base members 70 and 74, respectively to the first elongated member 62 to form a container 78.

The oyster cultivating apparatus 60 is also provided with a second cylindrically shaped elongated member generally designated, by the numeral, 90. The member 90 is provided with an open area 92 extending therethrough and a plurality of spaced aligned apertures 94 formed on the surface thereof. The second elongated member 90 has a circumference slightly smaller than that of the first elongated member 62. This allows the second elongated member 90 to fit snugly in the first elongated member 62 with the apertures 94 aligned adjacent to the apertures 66. The apertures 94 in the second elongated member 90 are smaller than the apertures 66 in the first elongated member 62. The first and second elongated members 62 and 90 may be for example formed of a lightweight hard plastic or a plastic coated wire having mesh walls.

The oyster cultivating apparatus 60 is also provided with a pair of rectangular shaped buoyant members 96 and 98. The buoyant member 96 is couplable to the first elongated member 62 at one end 100 thereof by a coupling member 102, and the buoyant member 98 is couplable to another end 104 of the first elongated member by a coupling member 106. The buoyant members 96 and 98 are provided to allow the apparatus 62 to float in water 108 substantially horizontal to the water floor surface 110 about six inches above that surface. The buoyant members 96 and 98, for example, may be made of a buoyant material such as styrofoam. Because the buoyant members 96 and 98 of the oyster cultivating apparatus 60 is coupled to the outside of the container 78, more space is available for cultivating oysters 54 in this embodiment than in the apparatus 10. Thus when it is desired to cultivate a larger number of oysters 54 the apparatus 60 may be desirable.

When it is desired to cultivate oysters 54 using the apparatus 60 of this invention the container 78 is initially assembled without upper member 70. That is the base member 74 is coupled to the lowermost portion 76 of the first elongated member 62 with coupling member 80. Once this is accomplished the second elongated member 90 is then aligned in the open area 64 in the first elongated member 62 so that the apertures 66 in the second elongated member are aligned with and adjacent to the apertures 94 in the first elongated member. Once the second elongated member 90 is in place in the first elongated member, the buoyant members 96 and 98 are coupled to the first elongated member 62. Infant oysters 54 are then placed in the open area 92 in the second elongated member 90 and the upper member 70 is then coupled to the uppermost portion 72 of the first elongated member 62 so that the oysters are sealed in the container 78. The cultivating apparatus 60 is then placed in water 110 where the cultivating can take place. The oysters 54 are allowed to cultivate and grow until they have grown to the point that they are too large to exit the apertures 66 in the first elongated member 62. Once the oysters 54 have reached this size, the apparatus 60 is removed from the water 110 and the second elongated member 90 is removed from the container 78. The apparatus 60 is then placed back in the water until the oysters 54 are fully cultivated.

It should be understood that the invention disclosed herein can be used for cultivating other species, such as, for example, fish, clams, mussels, or crabs.

It should be further understood that various changes and modifications can be made without departing from the spirit of the invention as defined in the claims.

What is claimed:
1. An oyster cultivating apparatus including:
   a first elongated member having a first plurality of openings formed therein and a first elongated open area extending therethrough;
   an upper member removably coupled to an upper portion of the first elongated member;

a base member removably coupled to a lowermost portion of the first elongated member;

a second elongated member having a second plurality of openings formed therein which are smaller than the first plurality of openings in the first elongated member and having an elongated open area extending therethrough, the second elongated member being aligned in the first elongated open area so that the second plurality of openings are in direct alignment adjacent to the first plurality of openings; and a buoyant member, aligned in the second open area of the second elongated member so that the first and second elongated members are maintained in water with their longitudinal axes oriented in a substantially horizontal position a predetermined distance above a water floor surface while oysters are being cultivated in the water.

2. An oyster cultivating apparatus as defined in claim 1 wherein the first elongated member is cylindrical in shape.

3. An oyster cultivating apparatus as defined in claim 2 wherein the second elongated member is cylindrical in shape.

4. An oyster cultivating apparatus as defined in claim 3 further including a first coupling means for coupling the upper member to the upper portion of the first elongated member.

5. An oyster cultivating apparatus as defined in claim 4 further including a second coupling means for coupling the base member to the lower-most portion of the first elongated member.

6. An oyster cultivating apparatus as defined in claim 5 wherein the first and second coupling means each include an elastic strap and an engaging member coupled to each end of the strap.

7. An oyster cultivating apparatus as defined in claim 6 wherein the buoyant member is elongated and cylindrical in shape.

8. An oyster cultivating apparatus including:
an elongated member having a plurality of openings formed therein and an elongated open area extending therethrough;
an upper member removably coupled to an upper portion of the elongated member;
a base member removably coupled to a lowermost portion of the elongated member; and
a buoyant member, aligned in the open area of the elongated member so that the elongated member is maintained in water with the longitudinal axes thereof oriented in a substantially horizontal position a predetermined distance above a water floor surface while oysters are being cultivated in the water.

9. An oyster cultivating apparatus as defined in claim 8 wherein the elongated member is cylindrical in shape.

10. An oyster cultivating apparatus as defined in claim 9 further including a coupling means for coupling the upper member to the upper portion of the elongated member.

11. An oyster cultivating apparatus as defined in claim 10 wherein the coupling means includes an elastic strap and an engaging member coupled to each end of the strap.

12. An oyster cultivating apparatus as defined in claim 11 wherein the buoyant member is elongated and cylindrical in shape.

13. An oyster cultivating apparatus including:
a first elongated member having a first plurality of openings formed therein and a first elongated open area extending therethrough;
an upper member removably coupled to an upper portion of the first elongated member;
a base member removably coupled to a lowermost portion of the first elongated member;
a second elongated member having a second plurality of openings formed therein which are smaller than the first plurality of openings in the first elongated member and having an elongated open area extending therethrough, the second elongated member being aligned in the first elongated open area so that the second plurality of openings are in direct alignment adjacent to the first plurality of openings; and
a buoyant means, coupled to the first elongated member for controlling the position of the first and second elongated members so that the first and second elongated members are maintained in water with the longitudinal axes thereof oriented in a substantially horizontal position predetermined distance above a water floor surface while oysters are being cultivated in the water.

14. An oyster cultivating apparatus as defined in claim 13 wherein the buoyant means includes a first buoyant member coupled to one end of the first elongated member and a second buoyant member coupled to the other end of the first elongated member.

15. An oyster cultivating apparatus as defined in claim 14 wherein the first and second buoyant members are rectangular in shape.

16. An oyster cultivating apparatus including:
an elongated member having a plurality of openings formed therein and an elongated open area extending therethrough;
an upper member removably coupled to an upper portion of the elongated member;
a base member removably coupled to a lowermost portion of the elongated member; and
a buoyant means, coupled to the elongated member for controlling the position of the
elongated member so that the elongated member is maintained in water with the longitudinal axes thereof oriented in a substantially horizontal position a predetermined distance above a water floor surface while oysters are being cultivated in the water.

17. An oyster cultivating apparatus as defined in claim 16 wherein the buoyant means includes a first buoyant member coupled to one end of the elongated member and a second buoyant member coupled to the other end of the first elongated member.

18. An oyster cultivating apparatus as defined in claim 17 wherein the first and second buoyant members are rectangular in shape.

* * * * *